United States Patent

Saupe et al.

[15] 3,646,677
[45] Mar. 7, 1972

[54] COLLET CHUCK FOR A DENTAL INSTRUMENT

[72] Inventors: Martin Saupe, Mittelbiberach; Gerhard Farian, Biberach/Riss, both of Germany

[73] Assignee: Kaltenbach & Voigt, Biberach/Riss, Germany

[22] Filed: Sept. 8, 1969

[21] Appl. No.: 855,898

[30] Foreign Application Priority Data

Oct. 18, 1968 Germany.....................P 18 03 919.5

[52] U.S. Cl...............................................................32/26
[51] Int. Cl................................................................A61c 1/08
[58] Field of Search........................297/96, 102, 103; 32/26

[56] References Cited

UNITED STATES PATENTS

| 3,094,338 | 6/1963 | Page | 32/26 X |
| 3,218,028 | 11/1965 | Borden | 32/27 X |

*Primary Examiner*—Robert Peshock
*Attorney*—Weir, Marshall, MacRae & Lamb

[57] ABSTRACT

The invention relates to a collet chuck for a dental instrument and comprises two sleeves arranged concentrically within one another in play-free and force-locking relation. The outer sleeve is of an elastic material such as rubber. The inner sleeve is of a plastic composition, such as polyamide, which has less adhesion ability than the material of the outer sleeve. The outer sleeve is shorter in length than the inner sleeve whereby it may expand axially in response to radial pressure thereon.

5 Claims, 3 Drawing Figures

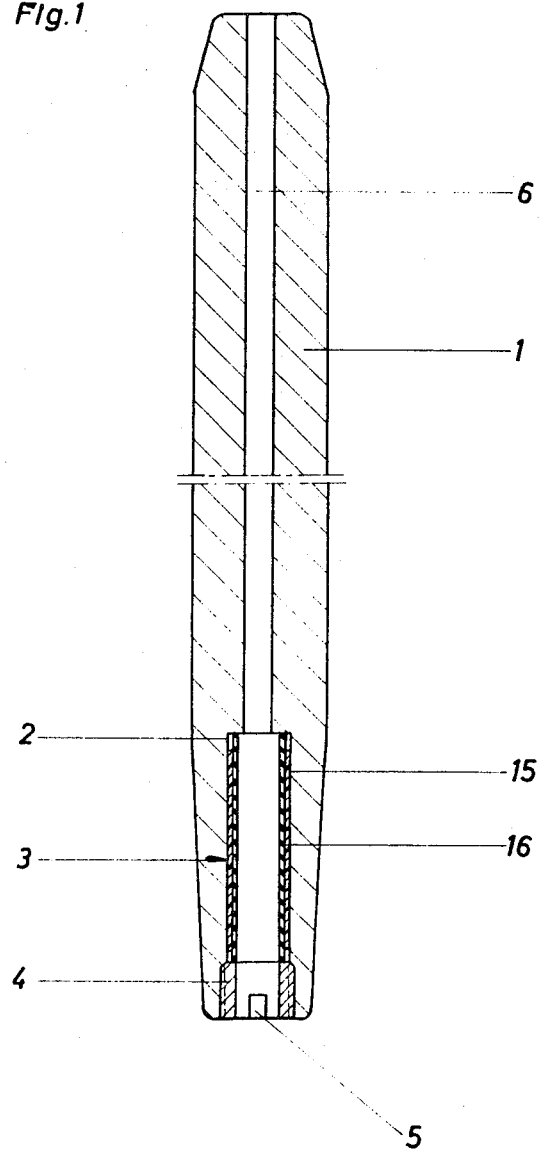

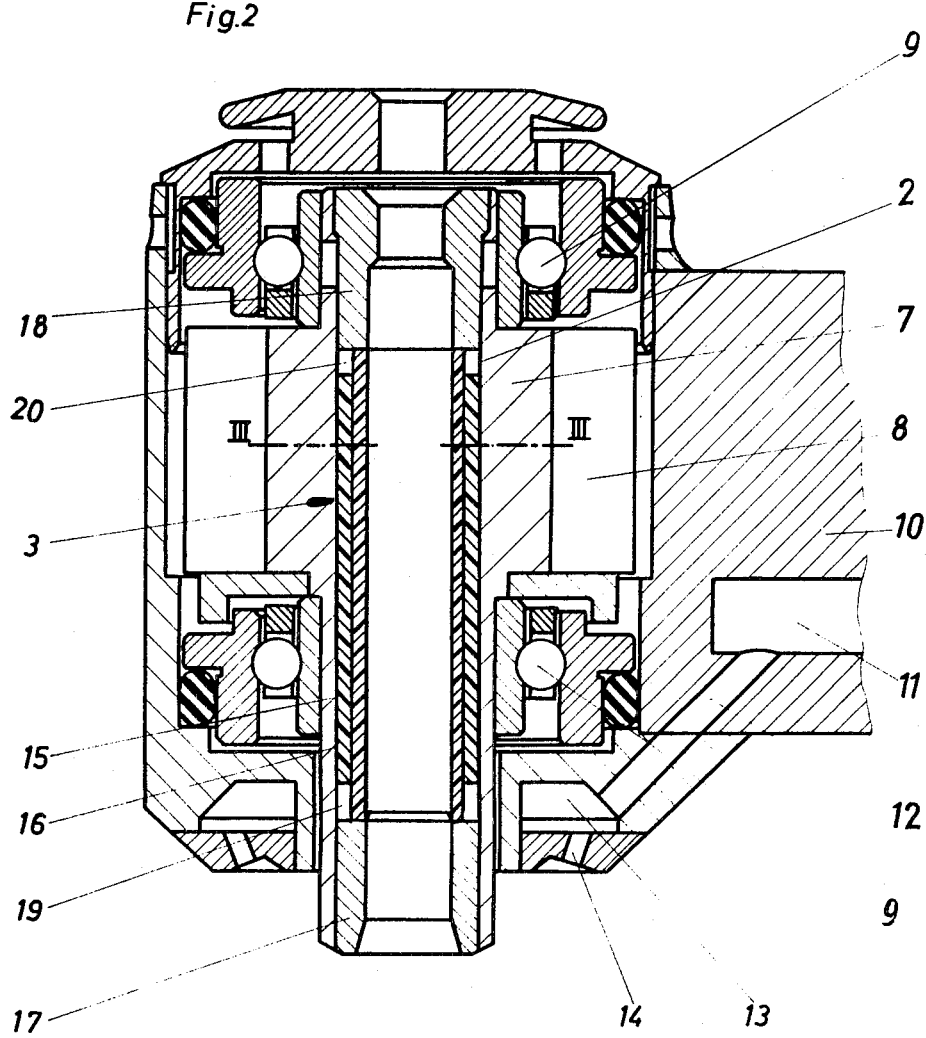

COLLET CHUCK FOR A DENTAL INSTRUMENT

The invention relates to a dental instrument, more particularly a straight or angle handpiece, with a tool adapted to be inserted by means of a collet chuck in a hollow shank arranged in the instrument, the collet chuck being formed by two concentric sleeves which are arranged in play-free and force-locking manner in one another, and the outer sleeve is constructed as a tubular element which is closed over its entire periphery and consists of rubber or a similar material, and the inner sleeve consists of a different material having a reduced adhesion relatively to the outer. This permits easier insertion and removal of the tool than is possible with collet chucks which consist entirely of rubber or a similar material.

A dental instrument of this kind is already known from U.S. Pat. No. 3,094,338 wherein the rotatable tool, constructed as a dental bur, is held in an inner sleeve which is made of metal and is mounted in play-free and force-locking manner in an outer sleeve made of rubber. The outer sleeve made of rubber itself is connected in force-locking manner to the rotating hollow shank of the instrument. The inner metal sleeve comprises a slot which extends over its entire length.

In this known construction, dust and oil can penetrate into the slot and thence can reach the inner wall of the metal sleeve, prejudicing clamping properties. Furthermore, the rubber sleeve can be damaged by the oil passing through the slot, so that the clamping properties of the chuck may again be reduced.

In accordance with the invention, there may be provided a dental instrument of the type initially mentioned wherein, whilst retaining good clamping properties at the collet chuck, the detrimental influence of dust or oil is obviated.

To solve this problem, the invention proposes, in a dental instrument of the type mentioned, that the inner sleeve also be constructed as a tubular element closed over its periphery, and consists of plastics material, e.g., polyamide, and at its tool end abuts on the inner end face of a guide sleeve and at its other end abuts on an annular shoulder of the hollow shank, whereas the outer sleeve terminates at least at one end at a spacing from the guide sleeve or annular shoulder.

Constructing the inner sleeve also as a tubular element closed over its periphery and abutting at its two ends against the guide sleeve and the annular shoulder, prevents the penetration of dust or oil into the annular space situated therebehind, in which the outer sleeve is arranged. As a result, the outer sleeve, which consists of rubber or a similar material, is given considerable protection from possible damage. The force-locking abutment of the tool shank against the outer wall of the inner sleeve cannot be disturbed with the constructional arrangement according to the present invention by penetrating oil or the like. Satisfactory operation, i.e., a good clamping effect from the collet chuck, is also guaranteed by the fact that owing to the spacing between at least the one end of the outer sleeve and the neighboring guide sleeve or annular shoulder it is guaranteed that there is adequate yielding of the material of the outer sleeve when the tool is inserted. Of course, the aforesaid annular space may also be provided at both ends of the outer sleeve.

The invention also proposes that the annular shoulder of the hollow shank against which one end of the inner sleeve abuts is also formed by the end face of a guide sleeve. This constructional form is particularly suitable when the dental instrument concerned is a turbine angle handpiece.

A further proposal of the invention consists in that the guide sleeve arranged at the tool end is inserted releasably in the hollow shank. This gives the advantage that, e.g., when the guide sleeve is screwed out, the clamping sleeve can easily be dismounted if necessary.

The construction of the collet chuck according to the invention makes it unnecessary, in the case of straight or angle handpieces, to arrange a special driver element for the hollow shank, such as engages with the collet chuck in known constructional arrangements, since there is an adequate adhesion between hollow shank, outer sleeve, inner sleeve and tool shank.

Constructional forms of the invention are shown by way of example in the drawings wherein:

FIG. 1 is a sectional view showing a dental instrument, constructed as a tool holder, e.g., for a mirror (not shown) with clamping sleeve, FIG. 2 shows a sectional view of an angle handpiece head of a dental instrument constructed as a turbine angle handpiece, with clamping sleeve, and FIG. 3 shows a section taken on the line III—III of FIG. 2, only the two sleeves of the collet chuck being illustrated.

In FIG. 1, the dental instrument constructed as a tool holder is designated as 1. At its lower end, the tool holder is constructed with a hollow shank. In the hollow shank 2 there is arranged a collet chuck 3 in which a dental too is adapted to have its shank inserted, e.g., the shank of a mouth mirror.

After the insertion of the collet chuck 3, it is secured by a screwed-in guide sleeve 4. The screwdriver slot 5 is used for screwing in the guide sleeve 4.

The tool holder 1 is of hollow construction in its interior from the hollow shank 2 onwards, so that, if necessary, the inserted tool shank can be ejected with the help of a thin rod or the like through the duct 6 thus formed.

The collet chuck 3 itself is constructed in the same way as in the constructional form shown in FIGS. 2 and 3. This constructional form will be described hereinafter.

FIG. 2 shows an angle handpiece head of a dental instrument constructed as a turbine angle handpiece. The rotor 7 which comprises a hollow shank and is thus constructed as a hollow shaft is provided with turbine blades 8 and is mounted in the usual way in the angle handpiece head by means of ball bearings 9. Of course, some other suitable bearing arrangement could be provided. The supply of air to the turbine is effected through an air duct which is not shown but passes through the shank 10 of the angle handpiece head, whereas discharge air is also discharged in any optional manner. Also shown in the drawings is a water supply duct 11 from which a conduit 12 leads to a spray chamber 13 through which, by means of small spraying pipes 14, spray water can be discharged on to the part of the tooth being treated, or on to the tool end point.

As in the form of embodiment according to FIG. 1, the collet chuck 3 is inserted in the rotor 7 constructed as a hollow shaft. The collet chuck comprises two sleeves 15, 16 which are arranged concentrically in one another in play-free and force-locking manner, the two sleeves 15, 16 being constructed as tubular elements closed over their periphery. The outer sleeve 15 consists of rubber or a similar material, whereas the inner sleeve 15 consists of a material having a lower adhesion ability than the outer sleeve, namely plastics material, e.g., polyamide.

At its two ends, the inner sleeve 16 abuts on the inner end face of respective guide sleeves 17 and 18. This provides a closure relatively to the annular space in which the outer sleeve 15 is situated. Between the ends of the outer sleeve 15 and the guide sleeves 17, 18 there is a spacing whereby annular spaces 19, 20 respectively, are formed. When the tool shank (not shown) is inserted, by means of the elastic inner sleeve 16 a pressure is exerted on the outer sleeve 15 made of rubber or similar material. The material of the outer sleeve 15 can yield into the annular spaces 19, 20, thus guaranteeing a satisfactory clamping effect.

The lower guide sleeve 17 in FIG. 2 can be screwed into the rotor 7, so that when the guide sleeve 17 is unscrewed easy interchanging of the collet chuck 3 is possible.

The outer sleeve 15 can also consist of two or more tubular elements which are arranged adjacent one another with spacing, and which may also be constructed in the manner of O-rings, if necessary.

Of course, the invention can also be used in a straight handpiece, e.g., a straight turbine handpiece.

We claim:

1. A collet chuck for a dental instrument having a hollow shank comprising two sleeves arranged concentrically within one another in play-free and force-locking relation in said shank, the outer one of said sleeves consisting of an elastic material, the inner one of said sleeves consisting of a plastic composition material of less adhesion ability than that of said outer sleeve, said outer sleeve being of less axial extent than said inner sleeve, each of said sleeves having open ends and a completely closed tubular wall extending from end to end thereof.

2. A collet chuck as defined in claim 1, said outer sleeve being of rubber and said inner sleeve being of polyamide.

3. In combination with a dental instrument having a hollow shank, an annular shoulder and a guide sleeve in said shank, a collet chuck in said shank and comprising two sleeves located between said shoulder and said guide sleeve and in play-free and force-locking relation, the outer one of said sleeves consisting of an elastic material, the inner one of said sleeves consisting of a plastic composition material of less adhesion ability than that of said outer sleeve, said outer sleeve being of less axial extent than said inner sleeve, each of said sleeves having open ends and a completely closed tubular wall extending from end to end thereof, said inner sleeve having one of its ends abutting said shoulder and the other of its ends abutting said sleeve, said outer sleeve having at least one of its ends in spaced relation to said shoulder or said sleeve.

4. A collet chuck as defined in claim 3, including a second guide sleeve in said shank and on which said shoulder is located.

5. A collet chuck as defined in claim 3, said guide sleeve releasably mounted in said shank.

* * * * *